June 16, 1964  J. D. DAVIDSON  3,137,258
STANDARD ADJUSTABLE DIE GAUGE
Filed June 19, 1961  2 Sheets-Sheet 1

INVENTOR.
JAMES D. DAVIDSON
BY
Woodhams Blanchard and Flynn
ATTORNEYS

June 16, 1964  J. D. DAVIDSON  3,137,258
STANDARD ADJUSTABLE DIE GAUGE
Filed June 19, 1961  2 Sheets-Sheet 2

INVENTOR.
JAMES D. DAVIDSON
BY
Woodhams Blanchard and Flynn
ATTORNEYS

United States Patent Office 3,137,258
Patented June 16, 1964

3,137,258
STANDARD ADJUSTABLE DIE GAUGE
James D. Davidson, 809 Knight Circle Drive, Marion, Ind.
Filed June 19, 1961, Ser. No. 118,087
7 Claims. (Cl. 113—49)

This invention relates to die gauges and particularly to a type thereof which can be readily standardized for application in a variety of situations.

The use of die gauges is a very old art and same are provided in a multitude of forms with respect to many different types of metal-forming operations. However, because of the diversity and complexity of the operations in which such gauges are used, the gauges themselves have been made in a multitude of different forms. This has created serious problems in inventorying the many types of gauges used in a metalworking shop and has created severe problems of expense in both the original provision of gauges and in the time required for the selection and application to the particular job of the gauges needed for properly handling same.

Accordingly, the objects of the invention are:

(1) To provide an improved die gauge structure for use in metal-forming operations and having standardized shapes, sizes, die-mounting surfaces, die holes and similar characteristics.

(2) To provide an improved die gauge structure, as aforesaid, which can be readily combined with a structure for loading and unloading sheet metal into a metal-forming press without appreciable additional expense.

(3) To provide an improved die gauge structure, as aforesaid, which is sufficiently standardized as to be interchangeable so that if a die gauge in use in connection with a particular job becomes damaged or broken it can be readily replaced by another die gauge taken from stock.

(4) To provide an improved die gauge structure, as aforesaid, which is capable of self-contained and continuous adjustment within a predetermined size range whereby to minimize the number of gauges of various sizes which must be kept in stock to provide a given shop with a wide range of metal-forming capacity.

(5) To provide an improved die gauge structure, as aforesaid, which is capable of extremely fine adjustment to a given size.

(6) To provide an improved die gauge structure, as aforesaid, which can be applied to a given die and accurately adjusted to a desired dimension, all within a minimum of time but without sacrifice in the accuracy of positioning the work.

(7) To provide an improved die gauge structure, as aforesaid, which can be readily moved from one job to another whereby to minimize the number of gauges which must be kept in stock in a given plant.

(8) To provide an improved die gauge structure, as aforesaid, which is very simple in construction and which can be made at a low cost, which cost is still further minimized by mass production thereof resulting from the standardization of their design.

(9) To provide an improved die gauge structure, as aforesaid, which can be adjusted from the outside of the die so as to render it unnecessary for an operator to place his hands in a dangerous position.

(10) To provide an improved die gauge structure, as aforesaid, which is strong and sturdy and capable of rigorous use, which objectives are achieved without involving excessive costs.

Other objects and purposes of the invention will be apparent to persons acquainted with this type of apparatus upon reading the following disclosure and inspecting the accompanying drawings.

Figure 1:
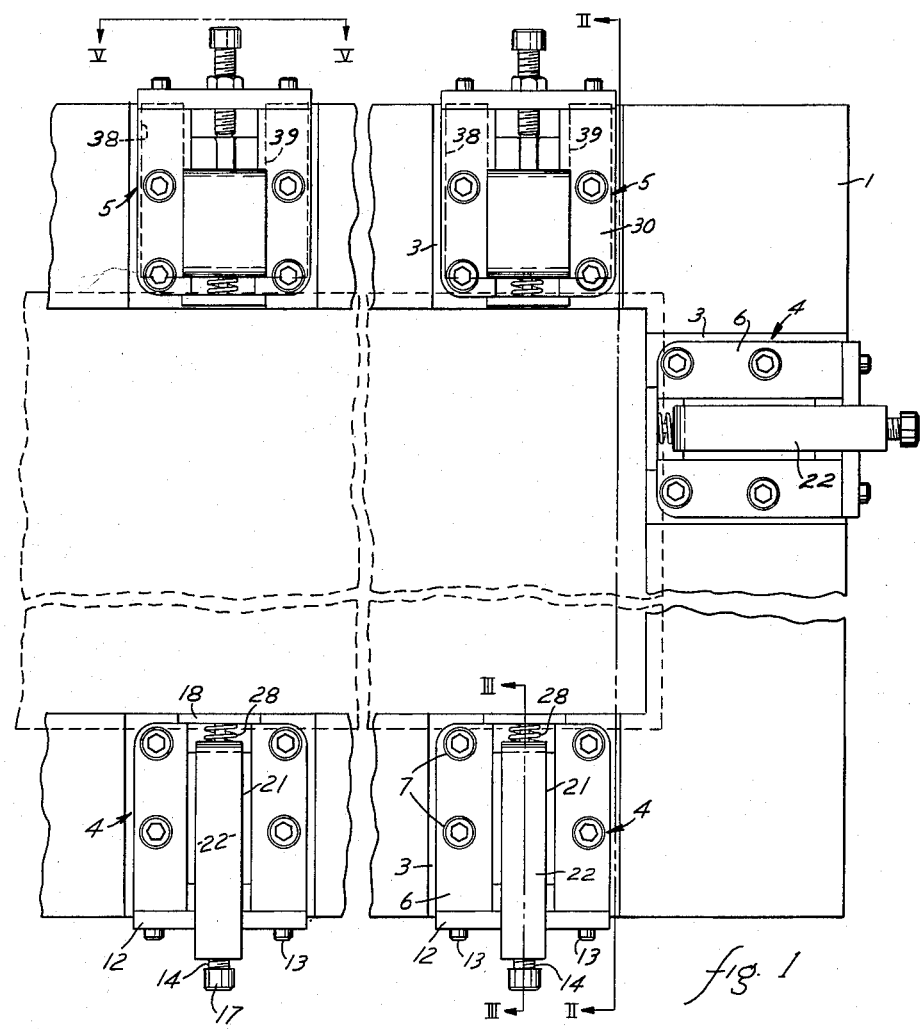
FIGURE 1 is a top fragmentary view of a lower die provided with the die gauges of the invention.

Gauges constructed in accordance with the invention are used in conjunction with a die body 1, said die body ordinarily having suitable recesses 3 for the reception of said gauges. Loading gauges 4 are provided on the loading side of the die and the unloading gauges 5 are provided on the unloading side of the die. Either type of gauge may be provided at the lateral sides of the die as desired and here a loading gauge 4 is provided thereat.

Figure 4:
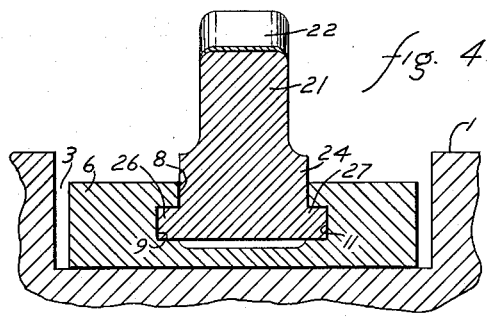
FIGURE 4 is a sectional view taken on line IV—IV of FIGURE 3.
Figure 2:
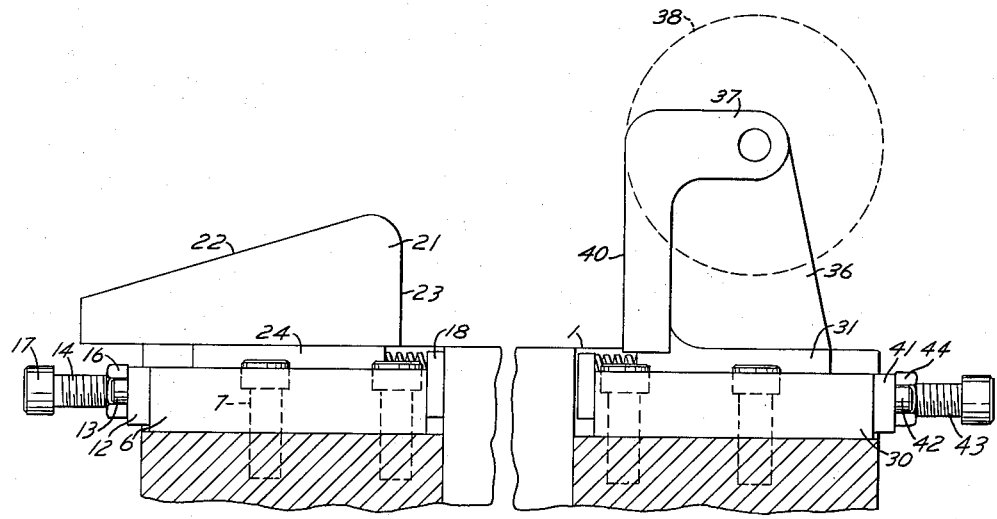
FIGURE 2 is a sectional view taken on line II—II of FIGURE 1.
Figure 5:
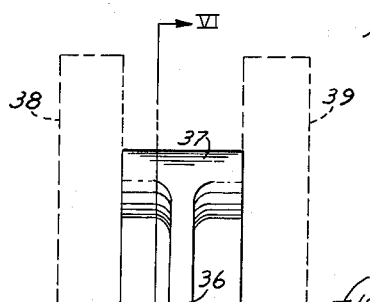
FIGURE 5 is an end view of a portion of the apparatus taken substantially along the line V—V of FIGURE 1.
Figure 6:
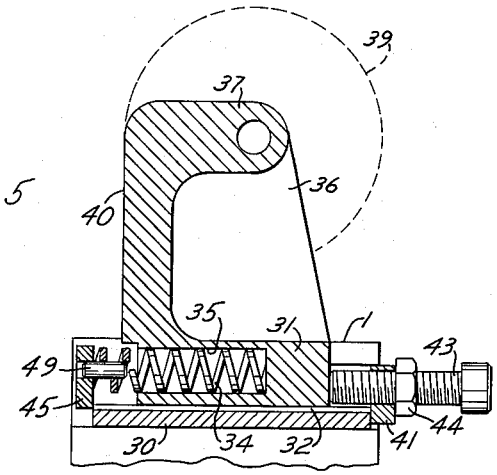
FIGURE 6 is a sectional view taken on line VI—VI of FIGURE 5.
Figure 3:
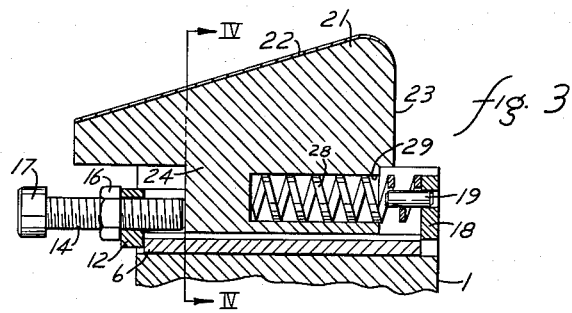
FIGURE 3 is a sectional view taken on line III—III of FIGURE 1.

The loading gauges 4 are identical and each includes a body 6 of generally rectangular shape which is releasably securable to the die body 1 by suitable connecting means, such as screws 7. A central, longitudinal slot 8 is provided in body 6, said slot 8 having ways 9 and 11 (FIGURE 4) provided at each side thereof for the slidable reception of the hereinafter described gauge device 21. A retainer plate 12 is provided at one end of body 6 and said retainer plate is secured thereto by screws 13. The retainer plate 12 extends across one end of slot 8. A screw 14 is threaded into and through the retainer plate 12 and extends into the slot 8. The screw 14 will normally be provided with a lock nut 16 for locking same with respect to retainer plate 12 and it also has a head 17 so that it may be rotated by a tool in customary fashion. A spring retainer plate 18 extends across the other end of the slot 8 and is fastened to the body 6 in a convenient manner, such as by welding. A pin 19 is affixed, as by welding, to the retainer plate 18 and extends into the slot 8.

The loading gauges 4 each include a gauge device 21 disposed in slot 8. The gauge device 21 has a suitable inclined loading surface 22 thereon which is preferably provided with a relatively soft surface, such as bronze, to prevent scratching of the blanks which are moved thereon. The gauge device 21 has a perpendicular surface 23 for gauging purposes as hereinafter set forth in more detail. The lower part 24 of said gauge device 21 is slidably disposed in slot 8 and it has rails 26 and 27 which are received in the ways 9 and 11, respectively. The lower part of the gauge device 21 has an opening 29 therein which extends lengthwise of the slot 8 and which has a spring 28 disposed therein. The outer end of the spring 28 abuts against plate 18. The gauge device 21 is applied to the base 6 by removing the plate 12 to open the outer end of the slot 8, placing the spring 28 in the opening 29 for engagement with plate 18 and for centering on the pin 19, and then sliding the gauge device 21 into place by sliding the lower part 24 thereof into slot 8. The plate 12 is then replaced, the screws 13 tightened and the outer position of the gauge device 21 determined by adjustment of the screw 14.

The unloading gauge 5 is comprised of a base 30 which is identical to the base 6 of the loading gauge 4, previously described, and said base 30 has a slot 32 corresponding to slot 8. A gauge device 31 is slidably disposed in slot 32. The gauge device 31 is provided with an opening 34 and a balancing spring 34 is disposed therein. Mounted on the base 30 are retainer plates 41 and 45, screws 42, screw 43, lock nut 44 and centering pin 49, which correspond to retainer plates 12 and 18, screw 13, screw 14, lock nut 16 and centering pin 19, respectively, in the previously described loading gauge 4. Hence, these elements need not be described in detail.

The gauge device 31 includes a roller support 36 extending upwardly from the base 30 and said roller support is provided with hub structure 37 on which a pair of rollers indicated in broken lines at 38 and 39 are rotatably mounted in any convenient manner. Said rollers are preferably rubber covered to avoid scratching or otherwise damaging the finished metal part. The roller support 36 includes a vertically extending surface 40 which is opposed to surface 23.

The gauge device 31 is mounted on the base 30 in the same manner as gauge device 21 is mounted on base 6 above described. Specifically, with the plate 41 removed, the device 31 carrying the spring 34 is inserted into the slot 32 until said spring encircles pin 49 and abuts against retainer 45. The plate 41 is then connected to base 30 and the screws 42 are tightened. The screw 43 is adjusted to the proper position and the lock nut 44 is applied for locking the screw 43 in a desired position.

It will thus be seen that by providing a given die with recesess and threaded openings arranged for the reception of the gauge bases 6 and 30, which bases are identical with each other, such gauges may be applied and removed quickly and easily. Further, since both the loading type and unloading type of gauge devices are mounted on the bases by identical slide structures, such gauge devices may be readily applied to or removed from a given die without even the necessity of changing the bases. Further, both gauge devices can be readily and quickly adjusted toward or away from the die opening as required to meet the requirements of a given operation and same may be done by loosening the lock nuts 16 or 44, adjusting the screws 14 or 43, and then retightening the respective lock nuts.

In use, a sheet of material to be worked may be loaded into the die by pushing same either by hand or automatically along the ramp surface 22 into the space between the gauging surfaces 23 and 40. The blank will usually be loaded in this manner and will fall accurately into place. When the metal-forming operation is completed, the blank may then be lifted as convenient, such as by hand, and the rollers 38 and 39 utilized for assisting the removal of the formed part from the press.

It will be recognized that the correct adjustment of the die gauges can be effected very rapidly so that the setup time for a given metal-forming operation will be held to a minimum. Further, if it is subsequently decided to use blanks of slightly different sizes in a given operation, said gauges can be very quickly and easily adjusted for such different size without replacing any of the parts and without even the necessity of the operator placing his hands within the metal-forming area of the apparatus.

Although a particular embodiment of the invention has been described above in detail for illustrative purposes, it will be recognized that variations or modifications of such disclosure, which lie within the scope of the appended claims, are fully contemplated.

What is claimed is:
1. A die gauging device, comprising the combination:
a base and means associated with said base for fastening same to a die;
means defining a slot arranged lengthwise of said base and having slideways arranged longitudinally therein;
a slide arranged within said slot having rails engaging said slideways for slidable movement thereon, one end of said slide having a longitudinally extending opening;
a spring within said opening and means closing one end of said slot and engaging one end of said spring;
a plate closing the other end of said slot;
a screw threadedly received into said plate for bearing against the other end of said slide whereby rotation of said screw will adjust the position of said slide within said slot;
means providing a vertically extending gauging surface on and above said base.

2. The device defined in claim 1 including means on said slide for assisting movement of a workpiece blank with respect to the base and said gauging surface.

3. The device defined in claim 2 wherein said means on said slide comprises a loading ramp.

4. The device defined in claim 2 wherein said means on said slide comprises an unloading roller.

5. A die gauging device, comprising the combination:
a base and means associated with said base for fastening same to a die;
elongated guide means on said base and extending lengthwise thereof;
slide means engaging said guide means and being slideable therealong, said slide means having first and second surfaces which face in opposite directions longitudinally with respect to said guide means;
resilient means bearing at one end thereof against said first surface;
means at one end of said guide means and engaging the other end of said resilient means whereby said slide means is urged away from said one end of said guide means;
stop means at the other end of said guide means;
a screw threadedly received through said stop means and bearing at one end against said second surface whereby rotation of said screw will adjust the position of said slide means on said guide means; and
means providing a gauging surface on said slide means above said base.

6. A die gauging device, comprising:
a base and means for fastening same to a die;
means defining an elongated slot extending lengthwise in said base, said base having ways on opposite sides of said slot;
elongated slide means in said slot engaging said ways and being slideable therealong, said slide means including an upper portion extending upwardly through said slot and away from said base;
means extending through one longitudinal end of said slot for adjusting said slide means along said ways;
said upper portion having a vertically extending surface at one longitudinal end of said slide means which surface extends vertically upwardly from the upper side of said slot adjacent the other longitudinal end thereof, said upper portion also having an upper surface which extends from the upper end of said vertically extending surface toward the other longitudinal end of said slide means, said upper surface being inclined upwardly from said other longitudinal end toward said one longitudinal end of said slide means and providing a loading ramp for assisting movement of a workpiece blank with respect to said base.

7. A die construction comprising:
a die having a plurality of recesses in the upper surface thereof on opposite sides of a centrally located, sheet receiving zone;
a plurality of identical bases disposed in said recesses and means for fastening said bases to said die;
each base having elongated guide means whose lengthwise axis extends toward said sheet receiving zone;
a first set of identical gauge devices respectively engaging the bases on one side of said sheet receiving zone;
a second set of identical gauge devices respectively engaging the bases on the other side of the sheet receiving zone;
said first and second sets of gauge devices having identical slide means engaging the guide means of their respectively associated bases and being slidable therealong toward and away from the sheet receiving zone;

means for adjusting said slide means along said guide means;

the gauge devices of said first and second sets each including an upper portion which extends above the upper surface of said die, the gauge devices of said first set having a substantially vertically extending gauging surface at the end thereof adjacent said sheet receiving zone and having an upper surface which serves as a loading ramp for loading a sheet into said sheet receiving zone, the gauge devices of the second set having a vertically extending gauging surface at the end thereof adjacent said sheet receiving zone and having means for assisting unloading of the sheet from the sheet receiving zone, the gauging surfaces of both sets of gauge devices extending close to the upper surface of the die whereby the sheet can be snugly held therebetween.

References Cited in the file of this patent

UNITED STATES PATENTS

| | | |
|---|---|---|
| 844,746 | Rice | Feb. 19, 1907 |
| 1,775,732 | Nelson | Sept. 16, 1930 |

FOREIGN PATENTS

| | | |
|---|---|---|
| 74,783 | Germany | May 10, 1894 |
| 232,765 | Germany | Mar. 22, 1911 |